United States Patent
Gibson et al.

(10) Patent No.: US 8,782,653 B2
(45) Date of Patent: Jul. 15, 2014

(54) FINE GRAIN PERFORMANCE RESOURCE MANAGEMENT OF COMPUTER SYSTEMS

(75) Inventors: Gary Allen Gibson, San Diego, CA (US); Valeri Popescu, Rancho Santa Fe, CA (US)

(73) Assignee: VirtualMetrix, Inc., Rancho Santa Fe, CA (US)

( * ) Notice: Subject to any disclaimer, the term of this patent is extended or adjusted under 35 U.S.C. 154(b) by 491 days.

(21) Appl. No.: 13/072,596

(22) Filed: Mar. 25, 2011

(65) Prior Publication Data

US 2011/0239220 A1    Sep. 29, 2011

Related U.S. Application Data

(60) Provisional application No. 61/341,170, filed on Mar. 26, 2010.

(51) Int. Cl.
*G06F 9/46* (2006.01)

(52) U.S. Cl.
USPC .......................................................... 718/103

(58) Field of Classification Search
CPC ...................................................... G06F 9/50
See application file for complete search history.

(56) References Cited

U.S. PATENT DOCUMENTS

| | | | |
|---|---|---|---|
| 4,980,857 A | 12/1990 | Walter et al. | |
| 5,943,691 A | 8/1999 | Wallace et al. | |
| 6,671,762 B1 | 12/2003 | Soni et al. | |
| 6,845,456 B1 | 1/2005 | Menezes et al. | |
| 7,228,355 B2 | 6/2007 | Dowling | |
| 7,228,546 B1 | 6/2007 | McCarthy et al. | |
| 7,281,145 B2 | 10/2007 | Merkin et al. | |
| 7,386,586 B1 | 6/2008 | Headley et al. | |
| 7,539,994 B2 | 5/2009 | McAlinden et al. | |
| 2002/0184292 A1 | 12/2002 | Lal | |
| 2002/0188691 A1 | 12/2002 | Ignatius et al. | |
| 2004/0073905 A1 | 4/2004 | Emer et al. | |
| 2004/0244000 A1 | 12/2004 | Frank et al. | |

(Continued)

FOREIGN PATENT DOCUMENTS

| | | |
|---|---|---|
| EP | 1501013 A2 | 1/2005 |
| JP | 7253893 A | 10/1995 |

(Continued)

OTHER PUBLICATIONS

International Search Report and Written Opinion dated Nov. 30, 2011, for corresponding international application No. PCT/US2011/030096.

(Continued)

*Primary Examiner* — Mengyao Zhe
(74) *Attorney, Agent, or Firm* — Mintz Levin Cohn Ferris Glovsky and Popeo, P.C.

(57) ABSTRACT

Execution of a plurality of tasks by a processor system are monitored. Based on this monitoring, tasks requiring adjustment of performance resources are identified by calculating at least one of a progress error or a progress limit error for each task. Thereafter, performance resources of the processor system allocated to each identified task are adjusted. Such adjustment can comprise: adjusting a clock rate of at least one processor in the processor system executing the task, adjusting an amount of cache and/or buffers to be utilized by the task, and/or adjusting an amount of input/output (I/O) bandwidth to be utilized by the task. Related systems, apparatus, methods and articles are also described.

39 Claims, 5 Drawing Sheets

(56) References Cited

U.S. PATENT DOCUMENTS

| | | | |
|---|---|---|---|
| 2005/0091654 A1* | 4/2005 | Lection et al. | 718/100 |
| 2005/0132238 A1* | 6/2005 | Nanja | 713/300 |
| 2005/0198636 A1 | 9/2005 | Barsness et al. | |
| 2005/0240752 A1 | 10/2005 | Yokoi et al. | |
| 2007/0074207 A1 | 3/2007 | Bates et al. | |
| 2007/0094661 A1 | 4/2007 | Baird et al. | |
| 2007/0110094 A1 | 5/2007 | Tobita et al. | |
| 2007/0234091 A1 | 10/2007 | Vishin et al. | |
| 2009/0007114 A1* | 1/2009 | Riddick | 718/100 |
| 2009/0055829 A1* | 2/2009 | Gibson | 718/103 |
| 2010/0091786 A1* | 4/2010 | Liu et al. | 370/419 |
| 2010/0131791 A1 | 5/2010 | Kimura | |
| 2011/0072218 A1 | 3/2011 | Manne et al. | |

FOREIGN PATENT DOCUMENTS

| | | | |
|---|---|---|---|
| JP | 2003131892 A | 5/2003 | |
| WO | WO-0038033 A2 | 6/2000 | |
| WO | WO-2008139685 A1 | 11/2008 | |

OTHER PUBLICATIONS

Bensaou ("Credit-based fair queuing (CBFQ): A simple service-scheduling Algorithm for packet-switched Networks", IEEE, 2001, pp. 591-604).

Choi, Kihwan, et al. "Dynamic Voltage and Frequency Scaling based on Workload Decomposition." *Proceedings of the 2004 International Symposium on Low Power Electronics and Design*. ISLEP'04. Newport Beach, CA. Aug. 9-11, 2004. New York, NY:ACM. US. Aug. 9, 2004. pp. 174-179.

Pillai, Padmanabhan and Shin, Kang G. "Real-Time Dynamic Voltage Scaling for Low-Power Embedded Operating Systems." Proceedings of the eighteenth ACM symposium on Operating Systems Principles. SOSP '01. New York, NY.Jan. 1, 2001. pp. 89-102.

Bjorn Anderson, "Static-priority scheduling on multiprocessors", 2003, Department of Computer Engineering, Chamlers University of Technology.

International Search Report and Written Opinion dated Feb. 27, 2009 for PCT/US2008/074122.

* cited by examiner

FINE GRAIN PERFORMANCE RESOURCE MANAGEMENT OF COMPUTER SYSTEMS

CROSS REFERENCE TO RELATED APPLICATION

The present application claims priority under 35 U.S.C. §119 to U.S. Provisional Application Ser. No. 61/341,170, filed Mar. 26, 2010, entitled "METHOD AND APPARATUS FOR FINE GRAIN PERFORMANCE RESOURCE MANAGEMENT OF COMPUTER SYSTEMS", the disclosure of which is incorporated herein by reference.

TECHNICAL FIELD

The subject matter described herein relates to systems, methods, and articles for management of performance resources utilized by tasks executing in a processor system.

BACKGROUND

A computing system not only consists of physical resources (processors, memory, peripherals, buses, etc.) but also performance resources such as processor cycles, clock speed, memory and I/O bandwidth and main/cache memory space. In traditional approaches, the performance resources have generally been managed inefficiently or not managed at all. As a result, processors are underutilized, consume too much energy and are robbed of some of their performance potential.

Many computer systems are capable of dynamically controlling the system and/or processor clock frequency(s). Lowering the clock frequency can dramatically lower the power consumption due to semiconductor scaling effects that allow processor supply voltages to be lowered when the clock frequency is lowered. Thus, being able to reduce the clock frequency, provided the computer system performs as required, can lead to reduced energy consumption, heat generation, etc. Similarly, many processors, as well as associated interfaces and/or peripherals, are able to rapidly enter and exit idle or sleep states where they may consume very small amounts of energy compared to their active state(s). As with lowering the clock frequency, placing one or more processors and/or part or all of a computer system in sleep state, can be used to reduce overall energy consumption provided the computer system performs as required.

In practice, conventional power management approaches detect idle times or "use modes" with slow system response when one or more processors can be idled or run at a lower clock speed and thus save energy. Power management based on "use modes" often has too coarse of a granularity to effectively take advantage of all energy reduction opportunities all the time.

SUMMARY

Execution of a plurality of tasks by a processor system are monitored. Based on this monitoring, tasks requiring additional performance resources are identified by calculating a progress error and/or one or more progress limit errors for each task. Thereafter, performance resources of the processor system allocated to each identified task are adjusted. Such adjustment can comprise: adjusting a clock rate of at least one processor in the processor system executing the task, adjusting an amount of cache and/or buffers to be utilized by the task, and/or adjusting an amount of input/output (I/O) bandwidth to be utilized by the task.

Each task can be selected from a group comprising: a single task, a group of tasks, a thread, a group of threads, a single state machine, a group of state machines, a single virtual machine, and a group of virtual machines, and any combination thereof. The processor can comprise: a single processor, a multi-processor, a processor system supporting multi-threading (e.g., simultaneous or pseudo-simultaneous multi-threading, etc.), and/or a multi-core processor.

Monitored performance metrics associated with the tasks executing/to be executed can be changed. For example, data transference can initially be monitored and later processor cycles can be monitored.

The progress error rate can be equal to a differential between work completed by the task and work to be completed by the task. Alternatively, the progress error rate is equal to a difference between a work completion rate for completed work and an expected work rate for the task. Each task can have an associated execution priority and an execution deadline (and such priority and/or deadline can be specified by a scheduler and/or it can be derived/used as part of a rate adaption function or a parameter to a rate adaption function). In such cases, the performance resources of the processor system can be adjusted to enable each identified task to be completed prior to its corresponding execution deadline and according to its corresponding execution priority.

Performance resources can be adjusted on a task-by-task basis. Each task can have an associated performance profile that is used to establish the execution priority and the execution deadline for the task. The associated performance profile can specify at least one performance parameter. The performance parameter can, for example, be a cache occupancy quota specifying an initial maximum and/or minimum amount of buffers to be used by the task and the cache occupancy quota can be dynamically adjusted during execution of the task. The cache occupancy quota can be dynamically adjusted based on at least one of: progress error, a cache miss rate for the task, a cache hit rate or any other metrics indicative of performance.

The performance parameter can specify initial bandwidth requirements for the execution of the task and such bandwidth requirements can be dynamically adjusted during execution of the task.

A processor clock demand rate required by each task can be determined. Based on such determinations, an aggregate clock demand rate based on the determined processor clock demand rate for all tasks can be computed. In response, the processor system clock rate can be adjusted to accommodate the aggregate clock demand rate. In some cases, the processor system clock rate can be adjusted to the aggregate clock demand rate plus an overhead demand rate. The processor clock demand rate can be calculated as a product of a current processor system clock rate with expected execution time for completion of the task divided by a time interval. The processor clock demand rate for each task can be updated based on errors affecting performance of the task and, as a result, the aggregate clock demand rate can be updated based on the updated processor clock demand rate for each task. Updating of the processor clock demand rate for each task or the aggregate clock demand rate can use at least one adaptation function to dampen or enhance rapid rate changes. A processor clock rate for each task can be added to the aggregate clock demand rate when the task is ready-to-run as determined by a scheduler or other system component that determines when a task is ready-to-run (such as an I/O subsystem completing an I/O request on which the task is blocked). The aggregate clock demand rate can be calculated over a period of time such that, at times, the processor system clock rate is higher than the aggregate clock demand rate, and at other times, the processor system clock rate is lower than the aggregate clock demand rate.

The processor system can include at least two processors and the aggregate clock demand rate can be determined for each of the at least two processors and be based on the processor demand rate for tasks executing using the corresponding processor. In such arrangements, the clock rate for each of the at least two processors can be adjusted separately and accordingly.

Each task is allocated physical memory. At least one task can utilize at least one virtual memory space that is mapped to at least a portion of the physical memory.

In another aspect, execution of a plurality of tasks by a processor system are monitored to determine at least one monitored value for each of the tasks. The at least one monitored value characterizes at least one factor affecting performance of the corresponding task by the processor system. Each task has an associated task performance profile that specifies at least one performance parameter, For each task, the corresponding monitored value is compared with the corresponding at least one performance parameter specified in the associated task performance profile. Based on this comparing, it is determined, for each of the tasks based on the comparing, whether performance resources utilized for the execution of the task should be adjusted or whether performance resources utilized for the execution of the task should be maintained. Thereafter, performance resources can be adjusted by modifying a processor clock rate for each of the tasks for which it was determined that performance resources allocated to such task should be adjusted and maintaining performance resources for each of the tasks for which it was determined that performance resources allocated to the task should be maintained.

The monitored value can characterize an amount of work completed by the task. The amount of work completed by the task can be derived from at least one of: an amount of data transferred when executing the task, a number of processor instructions completed when executing the task, processor cycles, execution time, etc.

In some variations, a current program state is determined for each task and the associated task performance profile specifies two or more program states having different performance parameters. With such an arrangement, the monitored value can be compared to the performance parameter for the current program state (and what is monitored can be changed (e.g., instructions data transfererence, etc.)).

At least one performance profile of a task being executed can be modified so that a corresponding performance parameter is changed. As a result, the monitored value can be compared to the changed performance parameter.

A processor clock demand rate required by each task can be determined. Thereafter, an aggregate clock demand rate can be computed based on the determined processor clock demand rate for all tasks. As a result, the processor system clock rate can be adjusted to accommodate the aggregate clock demand rate. A processor clock demand rate required by a particular task can be dynamically adjusted based on a difference between an expected or completed work rate and at least one progress limiting rate (e.g., a progress limit error, etc.). The processor clock demand rate required by each task can be based on an expected time of completion of the corresponding task.

The processor system clock rate can be selectively reduced to a level that does not affect the expected time of completion of the tasks. The processor system clock rate can be set to either of a sleep or idle state until such time that the aggregate clock demand is greater than zero. The processor system clock rate can fluctuate above and below the aggregate clock demand rate during a period of time provided that an average processor system clock rate during the period of time is above the aggregate clock demand rate.

The performance profile can specify an occupancy quota limiting a number of buffers a task can utilize. The occupancy quota can be dynamically adjusted based on a difference between an expected and completed work rate and one or more progress limiting rate (e.g., progress limit error etc.) Other performance metrics from a single source or multiple sources can be used to adjust the occupancy quota.

Utilization of bandwidth by an input/output subsystem of the processor system can be selectively controlled so that performance requirements of each task are met. The amount of bandwidth utilized can be dynamically adjusted based on a difference between an expected and completed work rate and one or more progress limiting rate (e.g., progress error, etc.). Other performance metrics (e.g., progress limit error, etc.) from a single source or multiple sources can be used to adjust the occupancy quota.

In a further aspect, a system includes at least one processor, a plurality of buffers, a scheduler module, a metering module, an adaptive clock manager module, a cache occupancy manager module, and an input/output bandwidth manager module. The scheduler module can schedule a plurality of tasks to be executed by the at least one processor (and in some implementations each task has an associated execution priority and/or an execution deadline). The metering module can monitor execution of the plurality of tasks and to identify tasks that require additional processing resources. The adaptive clock manager module can selectively adjust a clock rate of the at least one processor when executing a task. The cache occupancy manager module can selectively adjust a maximum amount of buffers to be utilized by a task. The input/output bandwidth manager module can selectively adjust a maximum amount of input/output (I/O) bandwidth to be utilized by a task.

Articles of manufacture are also described that comprise computer executable instructions permanently stored on computer readable media, which, when executed by a computer, causes the computer to perform operations herein. Similarly, computer systems are also described that may include a processor and a memory coupled to the processor. The memory may temporarily or permanently store one or more programs that cause the processor to perform one or more of the operations described herein.

The subject matter described herein provides many advantages. For example, by optimizing cache/buffer utilization and I/O bandwidth (based on performance requirements) in such a way as to provide performance guarantees/targets while at the same time using minimal resources, can allow a computer system to have greater capacity (because required resources for each component is minimized). In addition, the current subject matter can allow a computer system to require fewer/smaller physical computer resources thereby lowering cost and/or reducing physical size. In addition, overall power consumption can be reduced because fewer power consuming resources are needed. In addition, with multi-processors information such as aggregate clock rates, progress error and progress limit error can be used to inform a scheduler on which processor to schedule tasks.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 1:
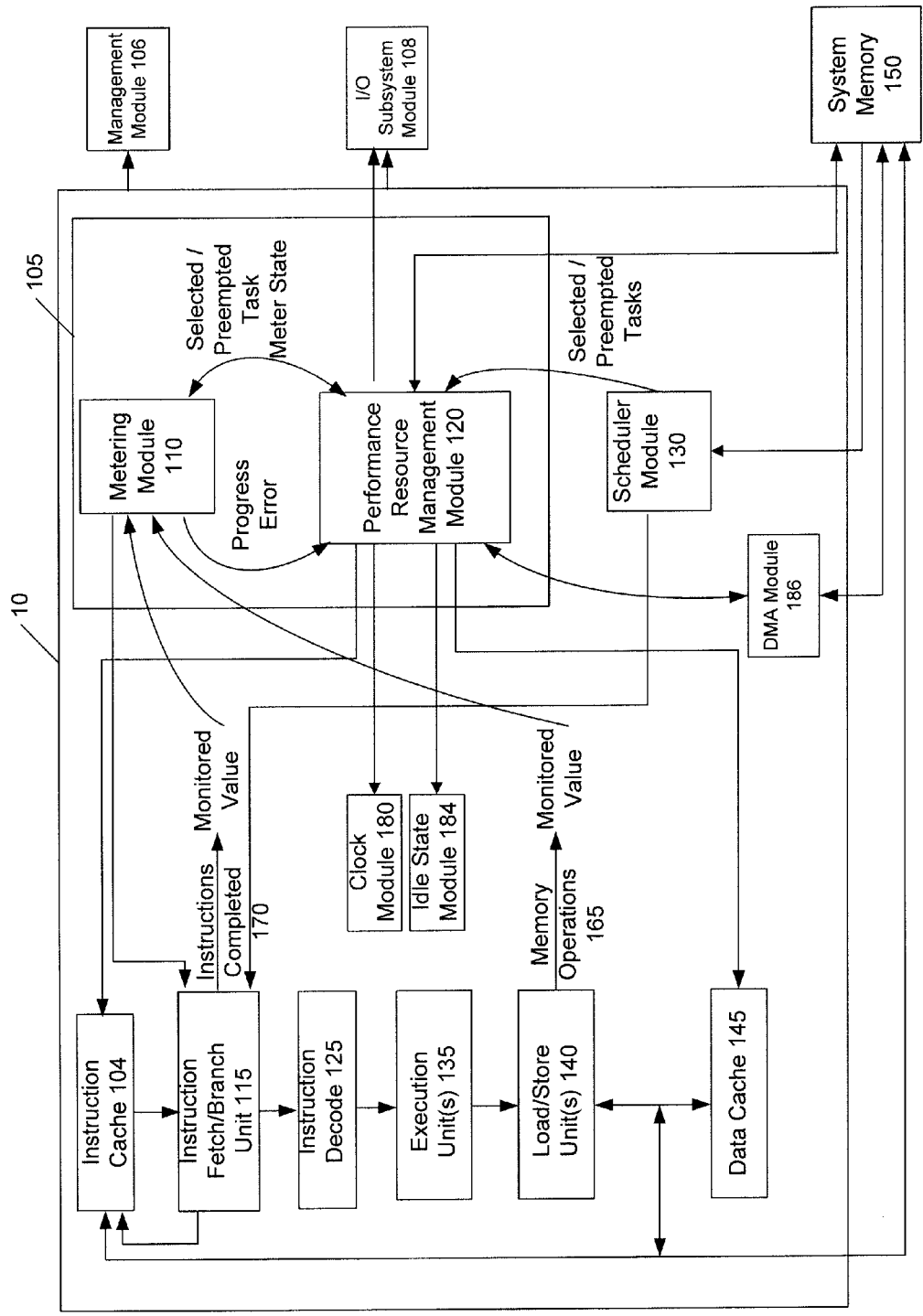
FIG. 1 is a block diagram of a computer system with performance resource management.

FIG. 1 is a simplified block diagram of a computer system including a processor system 10, a management module 106, an I/O (Input/Output) subsystem 108 and a system memory 150. Some of the commonly known elements of the processor system and the computer system are not shown in the figure in order to aid understanding of the current subject matter. The processor system 10 can include one or more of a central processing unit, a processor, a microprocessor, a processor core and the like. For example, the processor system 10 can comprise a plurality of processors and/or a multi-core processor. The functional elements of the processor system depicted in FIG. 1 can be implemented in hardware or with a combination of hardware and software (or firmware).

The processor system 10 can include an instruction cache 104, instruction fetch/branch unit 115, an instruction decode module 125, an execution unit 135, a load/store unit 140, a data cache 145, a clock module 180 for controlling the processor system's clock speed(s), an idle state module 184 for controlling the idle or sleep state of the processor system, a DMA (Direct Memory Access) module 186, a performance management system 105 and a scheduler module 130. The performance management system 105 can include a metering module 110 and a performance resource management module 120. In one implementation, a task context memory, which stores the task performance profile for a task, can be incorporated into the system memory 150. In other implementations, the task context memory may be independent of the system memory 150.

Throughout this document, a task may be referred to as a set of instruction to be executed by the processor system 10. Although the term task is sometimes referred to singularly, the term task can be interpreted to include a group of tasks (unless otherwise stated). A task can also comprise processes such as instances of computer programs that are being executed, threads of execution such as one or more simultaneously, or pseudo-simultaneously, executing instances of a computer program closely sharing resources, etc. that execute within one or more processor systems 10 (e.g., microprocessors) or virtual machines such as virtual execution environments on one or more processors. A virtual machine (VM) is a software implementation of a machine (computer) that executes programs like a real machine. In some implementations, the tasks can be state machines such as image processors, cryptographic processors and the like.

The management module 106 can be part of the computer system coupled to the processing module (for example, a program residing in the system memory 150). The management module 106 can create, and/or retrieve previously created performance profiles from system memory 150 or from storage devices such as hard disk drives, non-volatile memory, etc., and assign task performance profiles that specify task performance parameters to tasks directly or through their task context (a set of data containing the information needed to manage a particular task). In some implementations, the management module 106 can control the allocation of resources by determining/controlling the task performance profiles (e,g., through a set of policies/rules, etc.).

The I/O subsystem module 108 can be part of the computer system coupled to the processing module (for example, a program residing in the system memory 150). The I/O subsystem module 108 can control, and/or enable, and/or provide the means for the communication between the processing system, and the outside world possibly a human, storage devices, or another processing system. Inputs are the signals or data received by the system, and outputs are the signals or data sent from it. Storage can be used to store information for later retrieval; examples of storage devices include hard disk drives and non-volatile semiconductor memory. Devices for communication between computer systems, such as modems and network cards, typically serve for both input and output.

The performance management system 105 of the processor system 10 can control the allocation of processor performance resources to individual tasks and for the processor system. In some implementations, the performance management system 105 can control the allocation of state machine performance resources to individual tasks executing in the state machine. In other implementations the management module 106 can control the allocation of resources by determining/controlling the task performance profiles (e.g. through a set of policies/rules, etc.). For example, by controlling the allocation of performance resources to all tasks, each task can be provided with throughput and response time guarantees. In addition, by allocating the minimum performance resources to all tasks, a minimal amount of processor resources of the processor system 10 and/or a computing system incorporating the processor system 10 (that includes the I/O subsystem module 108 and the system memory 150, etc.) performance resources are utilized. In one example, the minimization of performance resources increases efficiency lowering energy consumption and requiring fewer/smaller physical computer resources resulting in lowered cost. In another example, the minimization of performance resources allocated to each task can enable the processor system 10 to have greater capacity enabling more tasks to run on the system while similarly providing throughput and response time guarantees to the larger number of tasks.

Tasks can be assigned performance profiles that specify task performance parameters. Examples of task performance parameters include work to be completed, We, time interval, Ti, and maximum work to be completed, Wm, cache occupancy and I/O (Input/Output) bandwidth requirements as described elsewhere in this document. The time interval can represent a deadline such that the task is expected to complete We work within Ti time. The work to be completed can determine the expected work to be performed by the task when it is scheduled for execution. The maximum work to be completed can specify the maximum work the task may accumulate if, for example, the completion of its expected work is postponed. The time interval, as well as other performance parameters, can also be utilized by the scheduling module 130 to influence scheduling decisions, such as using the time interval to influence when a Task should run or as a deadline (the maximal time allowed for the task to complete its expected work). The work rate, Wr, can be expressed through the relation Wr=We/Ti. In one implementation, these parameters can dynamically change with task state such that the performance profile parameters are sets of parameters where each set may be associated with one or more program states and changed dynamically during the task's execution. One example of a scheduler module (as well as related aspects that can be used in connection with the current subject matter) is described in U.S. Patent App. Pub. No 2009/0055829 A1, the contents of which are hereby fully incorporated by reference.

Performance profiles can be assigned to groups of tasks similar to the performance profile for an individual task. In one implementation, tasks that are members of a group share a common performance profile and the performance resource parameters can be derived from that common profile.

In some variations, a subset of the performance parameters can be part of a group performance profile while others are part of individual task performance profile. For instance, a task profile can include expect work parameters while the task is a member of a group that shares I/O bandwidth and cache occupancy performance parameters. A multiplicity of groups can exist where tasks are members of one or more groups that specify both common and separate performance profile parameters where the parameters utilized by the performance resource manager are derived from the various performance profiles (through a set of policies/rules)

The work can be a measure of data transference, processor instructions completed, or other meaningful units of measure of work done by the processor system 10 or state machine such as image processors, cryptographic processors and the like. As this work can be measured to a fine granularity, the performance resources can be similarly managed to a fine granularity.

The processor system 10 can execute instructions stored in the system memory 150 where many of the instructions operate on data stored in the system memory 150. The instructions can be referred to as a set of instructions or program instructions throughout this document. The system memory 150 can be physically distributed in the computer system. The instruction cache 104 can temporarily store instructions from the system memory 150. The instruction cache 104 can act as a buffer memory between system memory 150 and the processor system 10. When instructions are to be executed, they are typically retrieved from system memory 150 and copied into the instruction cache 104. If the same instruction or group of instructions is used frequently in a set of program instructions, storage of these instructions in the instruction cache 104 can yield an increase in throughput because system memory accesses are eliminated.

The fetch/branch unit 115 can be coupled to the instruction cache 104 and configured to retrieve instructions from the system memory 150 for storage within the instruction cache 104. The instruction decode module 125 can interpret and implement the instructions retrieved. In one implementation, the decode module 125 can break down the instructions into parts that have significance to other portions of the processor system 10. The execution unit 135 can pass the decoded information as a sequence of control signals, for example, to relevant function units of the processor system 10 to perform the actions required by the instructions. The execution unit can include register files and Arithmetic Logic Unit (ALU). The actions required by the instructions can include reading values from registers, passing the values to an ALU (not shown) to add them together and writing the result to a register. The execution unit 135 can include a load/store unit 140 that is configured to perform access to the data cache 145. In other implementations, the load/store unit 140 can be independent of the execution unit 135. The data cache 145 can be a high-speed storage device, for example a random-access memory, which contains data items that have been recently accessed from system memory 150, for example. In one implementation, the data cache 145 can be accessed independently of the instruction cache 104.

Figure 2:
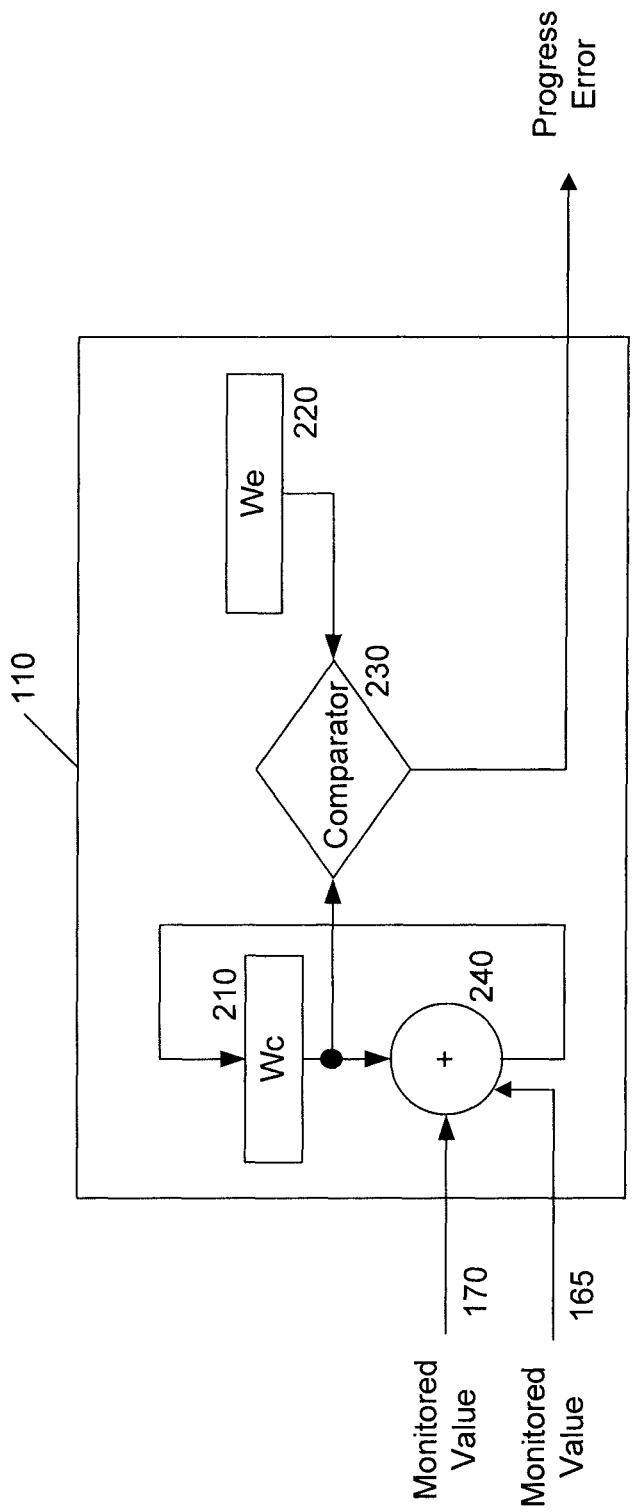
FIG. 2 is a block diagram of a metering module.
Figure 3:
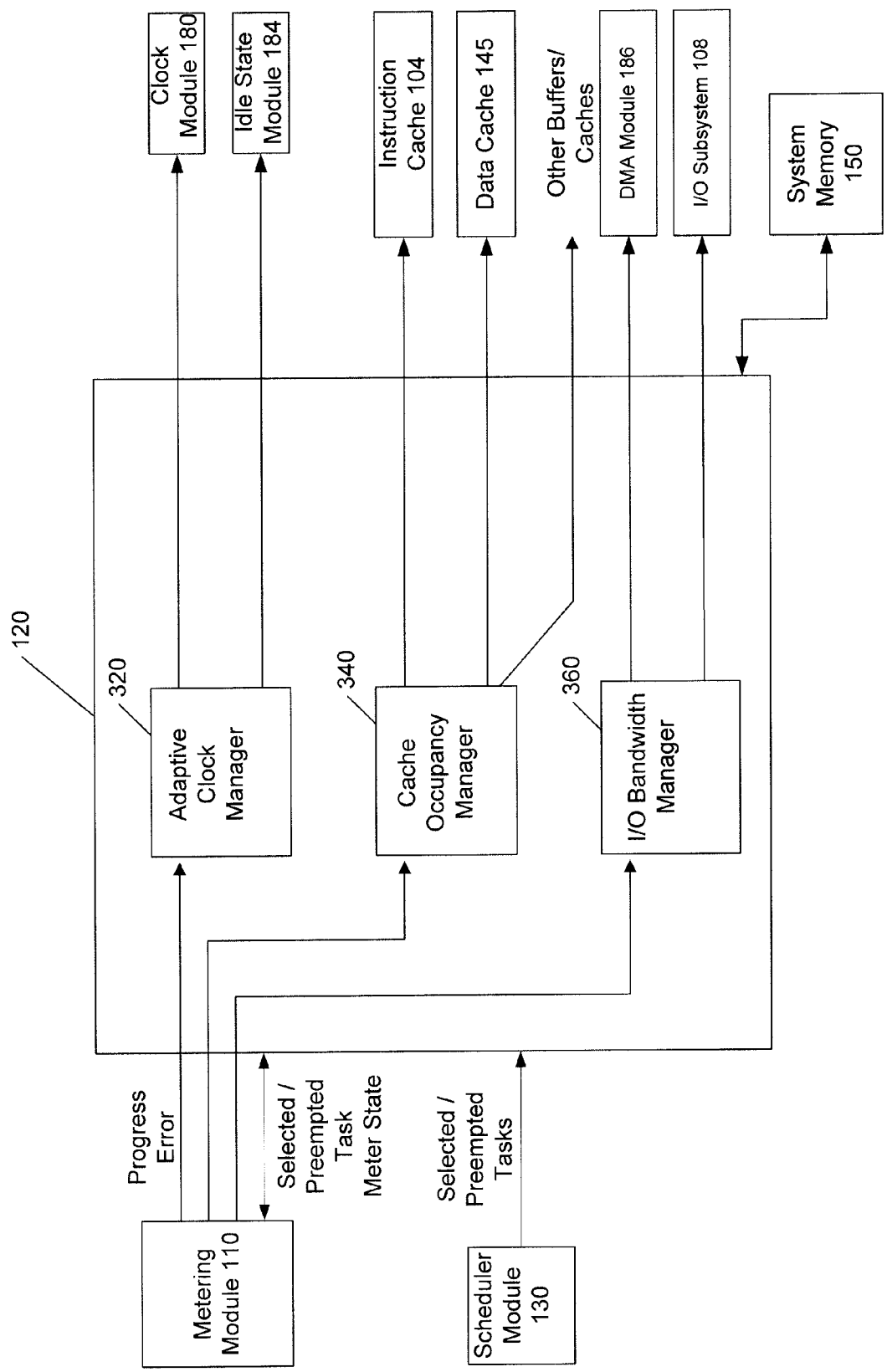
FIG. 3 is a block diagram of a performance resource manager module.

FIG. 2 is a block diagram of a metering module 110. For explanatory purposes, FIG. 2 will be discussed with reference to FIG. 1. The metering module 110 can measure the work performed or amount of work completed by the currently executing task(s). In one implementation, the metering module 110 can monitor the execution of the task to determine a monitored value related to the amount of work completed for the task. The monitored value related to the amount of work completed can be the actual amount of work completed, a counter value or the like that is proportional to or related to the amount of work completed.

In general, one implementation of the metering module 110 can comprise a work completed module 210 (Wc), a work to be completed module 220 (We), a comparator module 230, and an adder module 240. The work completed module 210 can be a work completed counter and the work to be completed module 220 can also be a work to be completed counter. The work to be completed counter can be updated based on the work rate to account for the passage of time. The work to be completed can be calculated by the performance resource manager, for example, when the task is selected for execution on the processor system by the scheduler module 130 informing the performance resource manager of the task selection.

The metering module 110 can measure and monitor the work completed by a task that is currently being executed on the processor system 10. One or more tasks can be implemented on the processor system 10 (e.g., processor(s) employing simultaneous or pseudo-simultaneous multithreading, a multi-processor, etc.). In one implementation the monitored value of work completed or information about the amount of work completed can be measured by the amount of instructions completed and can be acquired from the instruction fetch/branch unit 115 as illustrated by the arrow 170 in FIG. 1. The monitored values can also be measured by the amount of data transferred through memory operations and can be acquired from the load/store unit 140 as illustrated by the arrow 165 in FIG. 1. The metering module 110, when used to monitor memory operations (bandwidth), can be configured to only account for memory operations to/from certain addresses (such as a video frame buffer). This configuration can be varied on a task-by-task basis (with the configuration information part of the Task Context or task performance profile). In some implementations, there can be separate metering modules 110 for instruction completion and memory operations depending on specific details of the computer system implementation. These metering modules would be similar to a single metering module 110. As some processing modules 10 handle multiple tasks (threads) simultaneously, the instructions completed information can include information as to which thread had completed certain instructions (typically by tagging the information with thread or process or task identifier(s)). The memory operations information can similarly include this thread identifier in order for the metering module 110 associate these operations to the correct task. Processing modules 10 which include one or more of a central processing unit, a processor, a microprocessor, a processor core, etc can include a plurality of metering modules 110 for each such processor.

A monitored value related to the work performed or work completed We can be measured by counting the accesses to memory, instructions completed, and/or other measurable quantities that are meaningful measurements of work by the currently executing task(s). The monitored value, for example the number of accesses to memory, which can include the size of the access, can be received at the adder module 240 where they are summed and provided to the work completed module 210. The monitored values can also be measured by the memory operations that can be acquired from the load/store unit 140 as illustrated by the arrow 165 in FIG. 1. The work to be completed module 220 can receive a parameter value We related to the amount of work to be completed. The parameter value related to the amount of work to be completed and/or work rate can be a predetermined value that is stored in the task performance profile of a task. The work to be completed parameter value can be the actual amount of work to be completed, a counter value or the like that is proportional to or related to the amount of work to be completed. The parameter value can be a constant parameter or calculated from the work rate to include, for example, work credit which can be calculated to account for the time the task waits to be executed by multiplying the work rate by the passage of time. The work credit can also be calculated continuously, or periodically, such that the work to be done increases with the passage of time at the work rate even while the task in running. This computed work to be done can be limited to being no larger than a maximum work parameter. In one implementation, the parameter values can be predetermined by the management module 106 during the process of mapping a task to a computer system.

The work completed can be compared to the work to be completed by the comparator module 230. The result of this comparison, the progress error, can be a value representing a differential between the work completed and work to be completed and/or between the work completion rate and the work to be completed rate (the expected work rate) by including time in the comparison. One implementation can calculate a progress error based on a task achieving its expected work to be completed, within an expected runtime. For example, the error may be calculated by the relation: Progress Error=(qt/Qi)*We−Wc; where qt is the elapsed time since the task started executing and Qi is the expected time to complete the work to be completed; which may be dependent on processor and/or computer system state, such as the processor system clock frequency. A negative progress error, in the above example relation, can indicate the work completion is greater than the expected work at elapsed time qt. A progress error can be used to allocate or adjust the allocation of performance related resources to tasks as detailed elsewhere in this document.

One or more instances of meter modules can be utilized to determine if task's progress is limited (directly or indirectly) by quantities a meter module may measure; memory accesses or cache miss occurrences (i.e., failed attempts to read or write a piece of data in the buffer resulting in a main memory access, etc.), for instance, by metering those quantities and comparing them to pre-calculated parameters. In one implementation, the progress limit measurement can be achieved by providing the We module 220 of a meter module instance with a value to be compared to the accumulated metered quantity in the We module 210. The value supplied to module 220 can be considered a progress limit parameter. A comparator function can then compare the two values, including a comparison with respect to time, to determine if progress is limited by the quantity measured; for example, limited by a certain cash miss rate or memory access rate. The result can be expressed as a progress error (note that this result is different than the primary progress error arising from comparing work completed to work to be completed). The progress limit error values can be used to allocate or adjust the allocation of performance related resources to tasks as detailed elsewhere in this document. The progress limit parameters may be part of the task's performance profile A history of progress error and progress limit error values, from current and previous times a task was executing on the processor system, can be utilized to allocate or adjust the allocation of performance related resources to tasks as detailed elsewhere in this document. These values can be represented, for example, as cumulated progress and progress limit error values or as a series of current and historical values (which may be part of the task's performance profile).

The adaptive clock manager module 320 can manage the processor system's clock speed(s) by determining the required clock speed and setting the clock rate of the processor system 10 via the clock control module 180. The processor system's clock speed(s) can be determined by computing the aggregate clock demand rate of the tasks in the computer system. The aggregate clock demand rate, Ard, which represents the cumulated demand rate of all tasks being considered, can be equal to the $SUM_{i=Tasks}\{Trd[i]\}+Ro$ where $Trd[i]$ is the task demand rate for task i and Ro is the overhead demand rate of the processor/system not accounted for in the individual task's demand rates. The task demand rate can represent the clock rate demand for task i to complete its expected work, We, within a time interval or deadline Ti. In one implementation, the aggregate demand rate can include demand rates from the ready-to-run tasks while in other implementations the demand rate can include estimated demand rates from not ready-to-run tasks, calculating and/or speculating on when those tasks will be ready to run.

The overhead demand rate can be a constant parameter or it can depend on system state such that one or more values for the overhead demand rate is selected depending on system state. For some implementations, the overhead demand rate can be contained in the task demand rate (which then can incorporate the processor system overhead activity on behalf of the task). In one implementation, the overhead demand rate can be predetermined by the management module 106 during the process of mapping task to a computer system.

In cases in which the processor system's clock frequency F is constant while task i is running, the task demand rate can be calculated by the product of the frequency and expected execution time divided by the time interval; $Trd[i]=(F*Qi)/Ti$, where F is the actual clock rate during the tasks expected execution time Qi and Ti is the time interval or deadline. The expected execution time is the expected time for the task to complete its expected work and can be part of the task's performance profile. In general, the expected execution time can be derived from the previous executions of the task (running on the processor system) and can be a measure of the cumulative time for the task's expected work to be completed. In addition, the expected execution time is typically dependent on the processor system frequency. The task's demand rate can be a minimal clock rate for the task to complete its expected work within its time interval or deadline of Ti. In another implementation in which the processor system's frequency changes during the tasks execution (because the aggregate clock demand rate changes for instance), the task demand rate can be computed as the $SUM_{j=FrequencyChanges}\{(F[j]*Qi[j])/Ti\}$ where the expected execution time is divided into segments, one for each frequency (change) sub-interval. The task demand rate can be part of the task's performance profile.

In one implementation, the clock manager module 320 can request the processor run at a clock frequency related to the aggregate demand rate, Ard, making such requests when the value of Ard changes in accordance with certain dependencies describe elsewhere in this document. The actual system may only be capable of supporting a set of discrete processor and system clock frequencies, in which case the system is set to a supported frequency such that the processor system frequency is higher than or equal to the aggregate demand rate. In some processor systems, multiple clock cycles can be required to change the clock frequency in which case the requested clock rate can be adjusted to account for clock switching time.

During each task's execution, the progress error and/or progress limit errors can be monitored and the task demand rate updated based on one or more of these values, for example at periodic intervals. In one implementation, the updated task demand rate results in a new aggregate demand rate which can result in changing the processor system's clock as described elsewhere in this document. The progress error and progress limit errors can be used to adjust the demand rate directly or through one or more rate adaption functions implemented by the adaptive clock manager module 320. For example, one rate adaption function can adjust the task demand rate if the error is larger than certain limits, while another adaption function can change the demand rate should the error persist for longer than a certain period of time. The rate adaption function(s) can be used to dampen rapid changes in task and/or aggregate demand rates which may be undesirable in particular processor systems and/or arising from certain tasks and can be system dependent and/or task dependent. The rate adaptation functions can be part of the task's performance profile.

The adaptive clock manager module 320 can adjust the aggregate demand rate by adjusting the individual task demand rates to account for the tasks meeting their expected work in their expected time. In another variation, the processor clock frequency can be adjusted relative to the aggregate demand rate while adjusting the individual task demand rates separately with both adjustments arising from progress error and progress limit error values. Thus, the processor clock frequency, the aggregate demand rate, and individual task demand rates can be adjusted to match the sum of all tasks', being considered, expected work completed to their work to be completed in a closed loop form.

Demand rate adjustments, can allow the overhead demand rate to be included in the individual tasks demand rates and thus be an optional parameter.

Minimum and maximum threshold parameters can be associated with the task demand rate. These minimum and maximum threshold parameters can relate to progress error and progress limit error and can be used to limit the minimum and/or maximum task demand rate. In another implementation, thresholds can limit the minimum and maximum processor clock frequency chosen during the execution of the task. The minimum and maximum threshold parameters can be part of the task's performance profile.

The adaptive clock manager module 320 can detect when adjusting the processor clock frequency higher does not increase the work completed rate and the requested clock rate can be adjusted down without adversely reducing the rate of work completed. This condition can be detected, for example, by observing a change, or lack thereof, in progress error as processor frequency is changed. The clock manager module 320 can adjust the requested clock rate higher when the task's state changes such that increasing the clock frequency higher does increase the work completed rate. This detection can be accomplished by setting the processor clock frequency such that the progress error meets a certain threshold criteria, and when the error falls below a certain threshold, the clock frequency can be adjusted higher as greater progress is indicated by the reduction in progress error. Certain rate adaption function(s), which can include progress error and/or progress limit error, can be utilized in computing the processor clock frequency. These rate adaption functions can be system and/or task dependent and can be part of the task performance profile.

The task demand rate, rate adaption parameters, progress limit parameters, and/or thresholds, etc. can dynamically change with task state such that the performance profile parameters are sets of parameters where each set may be associated with one or more program states and changed dynamically during the execution of the task by the management module 106. In addition or alternatively, such task demand rate, rate adaptation parameters, progress limit parameters, and/or thresholds, etc. can be adjusted directly by the task (rather than the management module 106).

A task's demand rate can be added to the aggregate demand rate when the task becomes ready-to-run which may be determined by the scheduler module 130 (e.g., based on scheduling or other events such as becoming unblocked on I/O operations, etc.) or other subsystems such as the I/O subsystem. This demand rate can initially be specified by, or calculated from, the tasks performance profile and can be updated based, for example, on the task's work completion progress over time, updated through a rate adaption function as a function of progress error, and the like. The performance profile can contain one or more task state dependent performance parameters. In such cases, the task demand rate can be updated when these parameters change due to task state, or system state, change and can be further updated while the task is executing on the processor system through rate error adaptation (using the progress error and/or progress limit error in the computation of performance profile parameters).

In cases in which a task becomes non-runnable (based on, e.g., scheduling or other events such as becoming blocked on I/O operations, etc.,), the aggregate demand rate can be recalculated from the individual task demand rates. In another implementation that can have reduced overhead requirements as compared to calculating each individual task demand rate, the new aggregate demand rate can be calculated by subtracting the task's cumulative demand rate at the end of the time interval or current execution (when the expected work is completed), which ever is later, by placing the cumulative demand rate in a time-based queuing system, such as a calendar queue, which presents certain information at a specific time in the future. This implementation reserves the task's demand rate within the aggregate demand rate from the time the task rate is first added until the end of its time interval or its completes execution, whichever is later.

Figure 4:
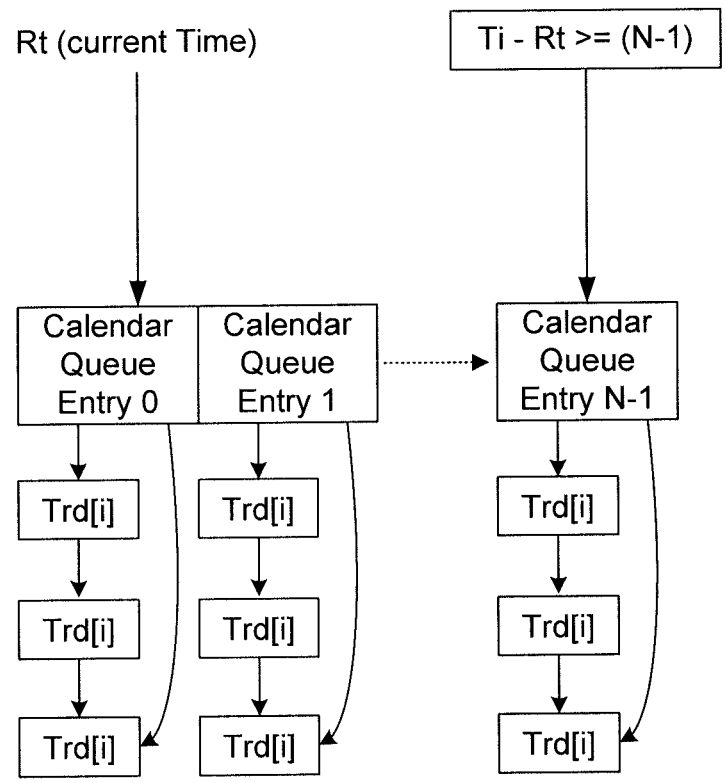
FIG. 4 is a diagram illustrating a calendar queue.

The adaptive clock manager module 320 can utilize a calendar queue for example, Calendar Queue Entry 1 (other calendar queue techniques can be utilized). The adaptive clock manager module 320 can insert a task's cumulative clock demand rate into the location Ti–Rt (difference from the time interval, to the current real time, Rt) units in the future (for example the tasks under Calendar Queue Entry N–1). As the calendar queue is of finite size, the index can be calculated as MAX(Ti–Rt, MAX_CALENDAR_SIZE–1) where MAX_CALENDAR_SIZE (N) is the number of discrete time entries of the calendar queue. When the current real time Rt advances to a non-empty calendar location, the clock manager module 320 can subtract each task's cumulated clock demand rate at that location for which Ti=Rt from the aggregate demand rate. This occurs when Ti=Rt at calendar queue entry 0 illustrated in FIG. 4. The index can represent a time related value in the future from the current time or real time. A task with Ti>Rt can be reinserted into the calendar queue within a certain threshold. The threshold and the size of the calendar can depend on the system design, precision of the real time clock and the desired time granularity. The calendar queue can be a circular queue such that as the real time advances, the previous current time entry becomes the last entry in the calendar queue. In the example 400 of FIG. 4, when the real time advances to entry 1, entry 0 becomes the oldest queue entry. The index can take into account the fact that the calendar is a circular queue. The current time index can advance from 0 to N−1 as real time advances. Thus at point N−1 the current time index wraps back to zero.

The adaptive clock manager module 320 can additionally manage entering into and resuming from the processor system's idle state. Should the aggregate clock demand be zero, the clock manager module 320 can place the processor system into an idle state until such time that the aggregate clock rate is/will be greater than zero. In some processor systems, multiple clock cycles may be required to enter and resume from idle state, in which case the time entering and resuming idle state as well the requested clock rate upon resuming active state can be adjusted to account for idle enter and resume time (as well as clock switching time).

The clock manager module 320 can also be capable of achieving certain aggregate demand rates, over a period of time, by requesting a frequency greater than or equal to the aggregate demand rate and placing the processor system into an idle state such that the average frequency (considering the idle time to have frequency of zero) equal to or higher than the aggregate demand rate. In implementations in which the processor system 10 has greater energy efficiency executing at higher frequency and is then placed in idle state to satisfy certain aggregate demand rates. In some implementations, the requested rate can be adapted to be higher than the calculated aggregate demand rate to bias placing the processing system in idle state.

The parameters from which the frequency and idle state selection are made can be derived from characterizing the processor system by the management module 106 during the process of mapping task(s) to a computer system.

The adaptive clock management module can request the processor system enter idle state by signaling the idle state module 184 to idle the processor system. The idle state can be exited when an event, such as an interrupt from an I/O device or timer, etc occurs.

In multiprocessor systems, the aggregate demand rate can be calculated individually for each processor or collectively for all processors or a subset of processors or a combination of these. Some tasks can be assigned to certain processors while others may be free to run on any or a certain set of processors. The aggregate demand rate can be calculated for the all processors observing the restrictions and freedoms of each task has to run on a certain processor including an affinity property where it is desirable to run a task on a particular processor.

In one implementation of a multiprocessor system, each processor clock rates and idle states can be controlled individually. In this case, the clock manager module 320 can select a combination of clock rates while idling one or more processors to achieve minimum energy. In cases in which clock rates may not be adjusted individually; but the idle states may be, a single clock rate can be chosen while idling one or more processors to achieve minimum energy consumption. In another implementation of a multiprocessor system, the clock rate can be chosen such that the aggregate demand rate for all, or a plurality of subsets of, processors is divided among the processors to achieve certain desired goals, such as maximizing throughput or minimizing task completion times of a tasks individually or of parallel computations performed by a plurality of tasks. Interaction with the scheduler module 130 (in the determination of which task(s) execute in which processor) may be necessary to achieve the desired goals.

The clock module 180 and idle state module 184 can have interaction with other computer system components, not shown in the drawings. These interactions may be necessary to enable changing the one or more processors' clock speed (s) or idle state(s). For example, changing the processor frequency can require changing the clock speed of busses, peripherals, the clock speed of system memory 150, etc. Similarly, to place the processor in or resume from a idle state, certain busses, peripherals, system memory 150, etc may require preparation before such state is entered (such as quiescing an I/O device and writing its buffers to system memory) or active state is resumed (such as initializing an I/O device to commence operation(s)).

The cache occupancy management module 340 can manage the use of buffer or cache occupancy quotas. These occupancy quotas can be numerical limits of the number of buffers a task may (or should) use. The occupancy quota, Oq, and current occupancy Oc can be additionally stored in the task's performance profile. Cache occupancy can be selectively allocated using, for example, a cache replacement algorithm such as those described in co-pending U.S. patent application Ser. No. 13/072,529 entitled "Control of Processor Cache Memory Occupancy", filed on Mar. 25, 2011 and claiming priority to U.S. Pat. App. Ser. No. 61,341,069, the contents of both applications are hereby incorporated by reference.

Occupancy in this case can be characterized as an indication of actual number of buffers being used by a task. A buffer is a memory or region of memory used to temporarily hold data (such as an input/output buffer cache) while it is being moved from one place to another or to allow faster access (such as a processor instruction/data cache). As buffers (or cache blocks/lines) are allocated to a task, the occupancy counter Oc can be incremented, as buffers are de-allocated to the task the occupancy counter can be decremented. Whenever the occupancy quota is greater than the occupancy counter (Oc>Oq), the task is exceeding its occupancy quota. Exceeding the occupancy quotas can cause that task's buffers to be replaced preferentially (cache block/line replacement) or prevent the allocation of new buffers until the entity is in compliance with its quota (Oc=<Oq). Occupancy quotas can contain multiple quota parameters such that higher or lower priority is given to comparing the occupancy to these additional quotas.

A task's occupancy quota can be part of its performance profile. This performance profile parameter may be statically set, may be dependent on program state, or may be dynamically calculated by the cache occupancy manager. Dynamic occupancy quotas may be adjusted based on the performance of the task, for example meeting its deadline, based on the cache miss information during its execution or feedback from execution in terms of expected work compared to work completed using progress error and/or progress limit errors as described elsewhere in this document.

The cache occupancy manager can adjust the occupancy quotas. Such adjustments can be based, for example, on predefined/configured limits which in turn can be a combination of system-level configured limits and limits contained in the task's performance profile. In one implementation, the occupancy quota can be adjusted based on the differential between a task's expected work rate and work completed rate, utilizing progress error for instance, or the cache miss rate, or a combination of the two. In such a variation, the computation of the occupancy quota can be made such that that the occupancy quota can be increased when a task is below its expected work rate or the cache miss rate is above a certain threshold; conversely, the occupancy quota can be reduced when the task is exceeding its expected work or the cache miss rate is below a certain threshold. This computation can also take progress limiting error values into account, for example, by detecting that the progress is being limited by another factor other than occupancy.

The cache occupancy management module can control occupancy quotas by setting quotas in the instruction cache 104 and/or data cache 145 if they have occupancy quota control mechanisms, or other buffer/caching components that can be part of, or coupled to, the processing system or computer system, such as a program stored in system memory 150. The cache occupancy parameters can relate to a task (or group of tasks) such that the system allocates occupancy quotas to or on behalf of the task; perhaps keeping track of a task if utilized by both the cache occupancy management module and the respective I/O subsystems. The quota control mechanisms can be implemented in hardware or software (firmware) or a combination of both.

Cache occupancy can include mapping virtual memory, memory management techniques allowing tasks to utilize virtual memory address space(s) which may be separate from physical address space(s), to physical memory. The physical memory in effect acts as a cache allowing a plurality of tasks to share physical memory wherein the total size of the virtual memory space(s) may be larger than the size of physical memory, or larger than the physical memory allocated to one or more tasks, and thus the physical memory, and/or a portion thereof, acts as a "cache". Physical memory occupancy of a task can be managed as described elsewhere in this document. The management module may be a separate module, as in 106, or may be an integral part of one or more operating systems, virtual machine monitors, etc.

A multiplicity of caches and/or buffer subsystems can exist and thus there can be several occupancy quota parameters utilized and stored in the task's performance profile. These caches and buffers can be embodied in hardware or software (firmware) or a combination of both.

A task's occupancy quota(s) can be modified such that work completed rate is matched to the expected work completed rate in a closed loop form where occupancy can be increased to meet expected work rates and/or decreased when expected work rates are being met or exceeded.

The modification of occupancy quota(s) can utilize rate adaption functions which may be task and dependent on task state.

Task prioritization relative to occupancy quotas can be utilized to guarantee certain higher priority tasks meet their expected work at the expense of lower priority tasks. In some implementations, the management module 106 can control the overall allocation of occupancy quotas by determining/controlling the maximum and minimum occupancy quotas and/or the maximum and minimum changes allowed to occupancy quotas, etc (e,g. through a set of policies/rules).

The I/O bandwidth management module 360 can manage the computer system's input output subsystem(s) utilization of bandwidth (which is a measure of data transference per unit time). I/O operations performed by tasks, or by an operating system on behalf of a task's I/O request(s) for instance, can be managed as a performance resource by the I/O bandwidth manager to ensure that tasks performance requirements of IO operations are met.

A task's I/O bandwidth can be part of its performance profile. This performance can be statically set (based on, for example, program state), or it can be dynamically calculated, such as by the I/O bandwidth manager. Dynamic I/O bandwidth values can be adjusted based on the performance of the task, for example, meeting its calculated deadline or feedback from execution in terms of expected work rate vs. work completed rate.

The I/O bandwidth manager can adjust the I/O bandwidth parameters, within certain configured limits which can be a combination of system-level configured limits and limits contained in the task's performance profile. The I/O bandwidth can be modified utilizing progress error and/or progress limit error values, or the expected I/O rate, or a combination of these. The computation of an I/O bandwidth rate can be made such that that the I/O bandwidth may be increased or decreased depending on progress and/or progress limit error values and thresholds. In general, these values and thresholds can be determined to match the tasks work completed rate to the work to be completed rate without using I/O bandwidth unnecessarily. A task's work can may be the I/O bandwidth rate, in which case task primary work is the transference of I/O data at a certain rate. As a task's I/O bandwidths can be adjusted such that the work completed rate is matched to the work to be completed rate in a closed loop form; where I/O bandwidths can be increased to meet expected work rates and/or decreased when expected work rates are being exceeded considering progress and progress limit errors.

I/O resources can be allocated through I/O bandwidth allocations, managed through the I/O bandwidth manager, in such a way as to provide system performance guarantees. Such guarantees can be that the total I/O bandwidth is not over allocated or that certain tasks receive their I/O bandwidth at the expense of others (depending on a set of policies/rules).

The I/O bandwidth management module can control I/O bandwidth by setting bandwidth parameters in the I/O subsystem module 108 for such bandwidth control mechanisms that exist, or other I/O components that may be part of, or coupled to, the processing system or computer system, such as a program stored in system memory 150. The I/O bandwidth parameters can relate to a task (or group of tasks) such that the system allocates bandwidth to or on behalf the task. In some variations, this can comprises keeping track of a task ID to associate with I/O operations such that the I/O bandwidth management module and the respective I/O subsystems may attribute data transference to a specific task. The I/O bandwidth control mechanisms can be implemented in hardware or software (firmware) or a combination of both.

In some implementations, DMA controllers can be utilized. Direct memory access is a feature of modern computers and microprocessors that allows certain hardware subsystems within the computer to access system memory for reading and/or writing independently of the central processing unit. Many hardware systems use DMA including disk drive controllers, graphics cards, network cards, sound cards and Graphics Processing Units (GPUs). DMA can also used for intra-chip data transfer in multi-core processors, especially in multiprocessor system-on-chips, where its processing element is equipped with a local memory (often called scratchpad memory) and DMA can be used for transferring data between the local memory and the main memory.

The I/O bandwidth manager can control I/O bandwidth through mechanisms that provide a bandwidth control mechanism to I/O operations, through bandwidth shaping. Bandwidth shaping can be accomplished by delaying certain data transference requests until sufficient time has passed to accumulate credit for the transference (where credit is a measure of data that is accumulated over time at a certain rate, representing the bandwidth). The I/O operation or the bandwidth management of data transference, including DMA, operations can be implemented in hardware or by software (or firmware).

A multiplicity of I/O subsystems, or instances of subsystems, devices and interfaces can exist and thus there may be multiple I/O bandwidth parameters utilized and stored in the task's performance profile. These I/O subsystems can be embodied in hardware or software (firmware) or a combination of both.

Task prioritization relative to I/O bandwidth can be utilized to guarantee certain higher priority tasks meet their expected work at the expense of lower priority Tasks. In another implementation, the I/O bandwidth management system can request I/O operation prioritization based on tasks matching their work completed to their work to be completed, taking progress error and progress limit error into account. This can, for example, consider progress and progress limit errors for all tasks of interest such that tasks with greater progress error, within certain progress limit error values, are given priority over tasks with lesser progress error within progress limit error values.

The progress error and progress limit errors can be used to adjust a task's I/O bandwidth parameters directly or though one or more rate adaption functions implemented by the I/O bandwidth manager. For example, one rate adaption function can be to only adjust the I/O bandwidth if the error is larger than certain limits while another adaption function can only may only change the demand rate should the error persist for longer than a certain period of time. The rate adaption function(s) can be system dependent and/or task dependent. The rate adaptation functions can be part of the task's performance profile.

Task prioritization relative to I/O bandwidth can be utilized to guarantee certain higher priority tasks meet their expected work at the expense of lower priority Tasks. In some implementations, the management module 106 can control the overall allocation of I/O bandwidth by determining/controlling the maximum and minimum I/O bandwidth and/or bandwidth parameters (e,g. through a set of policies/rules).

The scheduler module 130 can select the next task(s) to be executed from its list of tasks based on the task parameters including task priority. The scheduler module 130 can indicate that a higher priority task is ready to the processor system 10. The processor system 10 (or software on the processor system 10) can decide to preemptively switch from the currently running task and run the higher priority task. The scheduler module 130 or software in the processor system can indicate that a higher priority task is to be selected for execution, perhaps replacing a currently running task. In which case, the task currently running or executed in the processor system 10 can also be indicated to the performance resource manager 120. When this happens, the state of the metering module(s) 110 utilized for the currently running task can be saved in the task's context and the metering module is directed to monitor the newly selected task, by the performance resource manager (by updating the modules 210, 220 and the comparator function(s) within the metering module). Additional state in the performance resource manager can be modified similarly as a result of this task switching. In a multi-processor system, scheduling can be assigned on a processor-by-processor basis such that a task on a particular processor can be influenced by progress errors and/or progress limit errors of that task. This can be also be done on a thread-by-thread basis for multi-thread systems.

Figure 5:
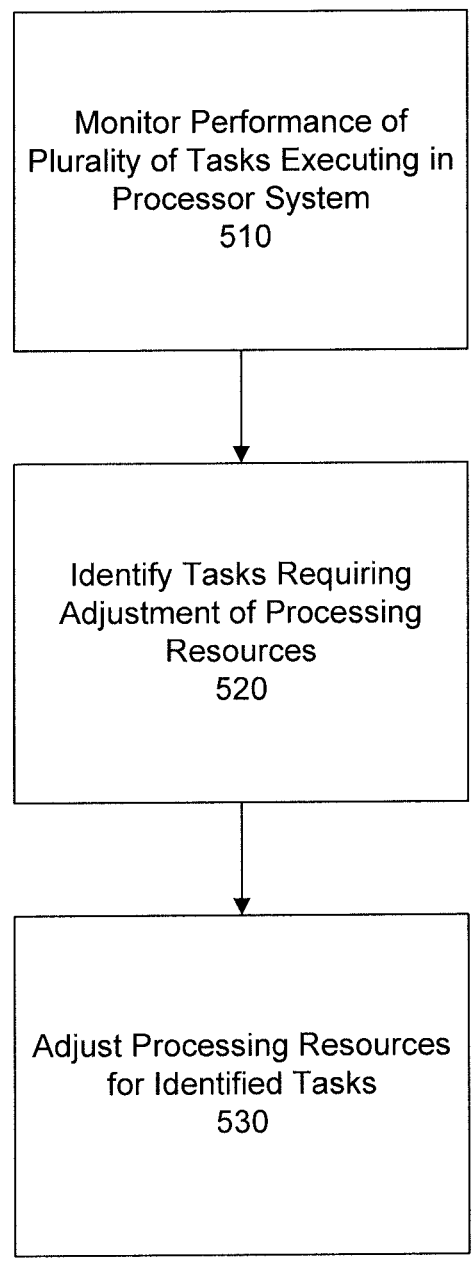
FIG. 5 is a process flow diagram illustrating a technique for processor system performance resource management.

FIG. 5 is a process flow diagram illustrating a method 500, in which, at 510, execution of a plurality of tasks by a processor system are monitored. Based on the monitoring, at 520, tasks requiring adjustment of performance resources are identified by calculating at least one of a progress error and a progress limit error for each task. Subsequently, at 530, performance resources of the processor system allocated to each identified task are adjusted. The adjusting can include, for example, one or more of: adjusting a clock rate of at least one processor in the processor system executing the task, adjusting an amount of cache and/or buffer to be utilized by the task, and adjusting an amount of input/output (I/O) bandwidth to be utilized by the task.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Although a few variations have been described in detail above, other modifications are possible. For example, the logic flow depicted in the accompanying Figures and described herein do not require the particular order shown, or sequential order, to achieve desirable results. Other implementations may be within the scope of the following claims.

What is claimed is:

1. A method comprising:
 individually monitoring execution of each a plurality of tasks by a processor system;
 calculating a progress error for each task during its execution, the progress error being equal to a differential between work completed by the task and work to be completed by the task and/or between a work completion rate for the task and a work to be completed rate for the task;
 identifying, based on the calculated progress errors, tasks requiring adjustment of performance resources; and
 adjusting performance resources of the processor system allocated to at least one identified task while such identified task continues to execute;
 wherein adjusting the performance resources comprise one or more of:
  adjusting a clock rate of at least one processor in the processor system executing the corresponding task;
  adjusting an amount of cache and/or buffers to be utilized by the corresponding task; or
  adjusting an amount of input/output (I/O) bandwidth to be utilized by the corresponding task;
 wherein the progress error is equal to $(qt/Qi)*We-Wc$, wherein qt is elapsed time since the task started executing, Qi is an expected time to complete the task, We is a value corresponding to work to be completed by the task, and Wc is a value corresponding to work completed by the task.

2. A method as in claim 1, wherein each task is selected from a group comprising: a single task, a group of tasks, a thread, a group of threads, a single state machine, a group of state machines, a single virtual machine, and a group of virtual machines.

3. A method as in claim 1, wherein the processor comprises a system selected from a group comprising: a single processor, a multi-processor, a processor system supporting simultaneous multi-threading, a multi-core processor.

4. A method as in claim 1, wherein at least one task has an associated execution priority and an execution deadline, and wherein the performance resources of the processor system are adjusted using the calculated progress error to enable each identified task to be completed by its corresponding execution deadline and according to its corresponding execution priority.

5. A method as in claim 1, wherein the performance resources are adjusted on a task-by-task basis.

6. A method as in claim 1, wherein each task has an associated performance profile that is used, by a scheduler module, to establish the execution priority and the execution deadline for the task.

7. A method as in claim 6, wherein the associated performance profile specifies at least one performance parameter.

8. A method as in claim 7, wherein the performance parameter is a cache occupancy quota specifying an initial maximum and/or minimum amount of buffers to be used by the task, wherein the cache occupancy quota is dynamically adjusted during execution of the task using the calculated progress error.

9. A method as in claim 8, wherein the cache occupancy quota is dynamically adjusted based on progress error for the task.

10. A method as in claim 8, wherein the performance parameter specifies initial bandwidth requirements for the execution of the task, wherein the bandwidth requirements are dynamically adjusted during execution of the task.

11. A method as in claim 1, further comprising:
determining a processor clock demand rate required by each task; and
computing an aggregate clock demand rate based on the determined processor clock demand rate for all tasks;
wherein the processor system clock rate is adjusted to accommodate the aggregate clock demand rate.

12. A method as in claim 11, wherein the processor system clock rate is adjusted to the aggregate clock demand rate plus an overhead demand rate.

13. A method as in claim 11, wherein determining a processor clock demand rate is a product of a current processor system clock rate with expected execution time for completion of the task divided within a time interval.

14. A method as in claim 11, wherein the processor clock demand rate for each task is updated based on progress errors affecting the performance of the task, wherein the aggregate clock demand rate is updated based on the updated processor clock demand rate for each task.

15. A method as in claim 14, wherein the updating of the processor clock demand rate for each task or the aggregate clock demand rate uses at least one adaptation function to dampen or enhance rapid rate changes.

16. A method as in claim 11, wherein a processor clock rate for each task is added to the aggregate clock demand rate when the task is ready-to-run.

17. A method as in claim 11, wherein the aggregate clock demand rate is calculated over a period of time such that, at times, the processor system clock rate is higher than the aggregate clock demand rate, and at other times, the processor system clock rate is lower than the aggregate clock demand rate.

18. A method as in claim 11, wherein the processor system comprises at least two processors, and wherein the aggregate clock demand rate is determined for each of the at least two processors and is based on the processor demand rate for tasks executing using the corresponding processor, and wherein the clock rate for each of the at least two processors are adjusted separately and accordingly.

19. A method as in claim 1, wherein each task is allocated physical memory, and wherein the method further comprises: enabling at least one task to utilize at least one virtual memory address space, the at least one virtual memory address space being mapped to at least a portion of the physical memory.

20. A method comprising:
monitoring execution of a plurality of tasks by a processor system to determine at least one monitored value for each of the tasks, the at least one monitored value characterizing at least one factor affecting performance of the corresponding task by the processor system, each task having an associated task performance profile that specifies at least one performance parameter including an execution deadline; and
comparing, for each of the tasks, the corresponding monitored value with the corresponding at least one performance parameter specified in the associated task performance profile;
determining, for each of the tasks based on the comparing, whether performance resources utilized for the execution of the task should be adjusted or whether performance resources utilized for the execution of the task should be maintained in order to meet the corresponding execution deadline; and
adjusting performance resources by modifying a processor clock rate for each of the tasks while such tasks continue to execute for which it was determined that performance resources allocated to such task should be adjusted and maintaining performance resources for each of the tasks for which it was determined that performance resources allocated to the task should be maintained;
wherein:
the at least one monitored value comprises a progress error,
the progress error is equal to $(qt/Qi)*We-Wc$,
qt is elapsed time since the task started executing,
Qi is an expected time to complete the task,
We is a value corresponding to work to be completed by the task, and
Wc is a value corresponding to work completed by the task.

21. A method as in claim 20, wherein the monitored value characterizes an amount of work completed by the task.

22. A method as in claim 21, wherein the amount of work completed by the task is derived from at least one of: an amount of data transferred when executing the task, a number of processor instructions completed when executing the task, processor cycles, and execution time.

23. A method as in claim 20, further comprising:
determining, for each task, a current program state for the task;
wherein the associated task performance profile specifies two or more program states having different performance parameters, and wherein the monitored value is compared to the performance parameter for the current program state.

24. A method as in claim 20, further comprising:
modifying at least one performance profile of a task being executed so that a corresponding performance parameter is changed;
wherein the monitored value is compared to the changed performance parameter.

25. A method as in claim 20, further comprising:
determining a processor clock demand rate required by each task;
computing an aggregate clock demand rate based on the determined processor clock demand rate for all tasks; and
adjusting a processor system clock to accommodate the aggregate clock demand rate.

26. A method as in claim 25, further comprising:
dynamically adjusting a processor clock demand rate required by a particular task based on a difference between an expected and completed work rate and at least one progress limiting rate.

27. A method as in claim 26, wherein the processor clock demand rate required by each task is based on an expected time of completion of the corresponding task.

28. A method as in claim 27, further comprising:
reducing the processor system clock rate to a level that does not affect the expected time of completion of the tasks.

29. A method as in claim 26, further comprising:
reducing the processor system clock rate in either of a sleep or idle state until such time that the aggregate clock demand is greater than zero.

30. A method as in claim 26, wherein the processor system clock rate fluctuates above and below the aggregate clock demand rate during a period of time provided that an average processor system clock rate during the period of time is above or equal to the aggregate clock demand rate.

31. A method as in claim 20, wherein the performance profile further specifies an occupancy quota influencing an amount of cache and/or buffers a task can utilize.

32. A method as in claim 31, wherein the occupancy quota is dynamically adjusted based on a difference between an expected or completed work rate and at least one progress limiting rate.

33. A method as in claim 20, wherein utilization of bandwidth by an input/output subsystem of the processor system is controlled so that performance requirements of each task are met.

34. A method as in claim 33, wherein an amount of bandwidth utilized is dynamically adjusted based on a difference between an expected and completed work rate and at least one progress limiting rate.

35. A processor system comprising:
at least one processor;
a plurality of buffers;
a scheduler module to schedule a plurality of tasks to be executed by the at least one processor;
a metering module to individually monitor execution of each of the plurality of tasks including progress errors and to identify tasks that require additional processing resources in order to meet corresponding pre-defined execution deadlines, the progress error being equal to a differential between work completed by a corresponding task and work to be completed by the task and/or between a work completion rate for the task and a work to be completed rate for the task;
an adaptive clock manager module to selectively adjust a clock rate of the at least one processor when executing a task;
a cache occupancy manager module to selectively adjust a maximum amount of cache and/or buffers to be utilized by a task during its execution; and
an input/output bandwidth manager module to selectively adjust a maximum amount of input/output (I/O) bandwidth to be utilized by a task;
wherein the progress error is equal to $(qt/Qi)*We-Wc$, wherein qt is elapsed time since the task started executing, Qi is an expected time to complete the task, We is a value corresponding to work to be completed by the task, and Wc is a value corresponding to work completed by the task.

36. A method as in claim 19, wherein a total size of virtual memory address space for all tasks is larger than a total of physical memory allocated to all tasks.

37. A method comprising:
individually monitoring execution of each of a plurality of tasks by a processor system comprising memory;
calculating a progress error for each task during its execution, wherein the progress error is equal to $(qt/Qi)*We-Wc$, wherein qt is elapsed time since the task started executing, Qi is an expected time to complete the task, We is a value corresponding to work to be completed by the task, and Wc is a value corresponding to work completed by the task;
identifying, based on the calculated progress error, tasks requiring adjustment of performance resources; and
adjusting, based on the identifying, performance resources of the processor system allocated to at least one identified task while it continues to execute;
wherein adjusting the performance resources comprise one or more of:
adjusting a clock rate of at least one processor in the processor system executing the corresponding task;
adjusting an amount of cache and/or buffers to be utilized by the corresponding task; or
adjusting an amount of input/output (I/O) bandwidth to be utilized by the corresponding task.

38. A method as in claim 1, wherein the work completed is based on one or more of: a number of processor cycles, an amount of data transference, or instructions completed by the corresponding task.

39. A system as in claim 35, wherein the work completed is based on one or more of: a number of processor cycles, an amount of data transference, or instructions completed by the corresponding task.

* * * * *